(12) United States Patent
Shiga

(10) Patent No.: US 7,451,192 B2
(45) Date of Patent: Nov. 11, 2008

(54) DATA COMMUNICATION APPARATUS AND METHOD, DATA COMMUNICATION SYSTEM, INFORMATION-PROCESSING APPARATUS AND METHOD, RECORDING MEDIUM, AND PROGRAM

(75) Inventor: Tomohisa Shiga, Kanagawa (JP)

(73) Assignee: Sony Corporation, Tokyo (JP)

( * ) Notice: Subject to any disclaimer, the term of this patent is extended or adjusted under 35 U.S.C. 154(b) by 1032 days.

(21) Appl. No.: 10/192,968

(22) Filed: Jul. 11, 2002

(65) Prior Publication Data

US 2003/0014559 A1   Jan. 16, 2003

(30) Foreign Application Priority Data

Jul. 13, 2001   (JP)   ............................ P2001-213946

(51) Int. Cl.
    *G06F 15/16*   (2006.01)
(52) U.S. Cl. ........................ 709/218; 709/216; 709/228; 710/5; 710/7; 710/20; 710/300; 713/100; 711/100
(58) Field of Classification Search ................. 709/218, 709/222, 225, 227, 231, 228; 710/7; 713/100
    See application file for complete search history.

(56) References Cited

U.S. PATENT DOCUMENTS 5,761,417 A * 6/1998 Henley et al. ............... 709/231
5,805,821 A * 9/1998 Saxena et al. ............... 709/231
6,466,978 B1 * 10/2002 Mukherjee et al. .......... 709/225
6,480,901 B1 * 11/2002 Weber et al. ................ 709/246
6,480,955 B1 * 11/2002 DeKoning et al. .......... 713/100
6,496,856 B1 * 12/2002 Kenner et al. ............... 709/218
6,584,499 B1 * 6/2003 Jantz et al. .................. 709/220
6,801,954 B1 * 10/2004 Rust et al. ....................... 710/7
6,826,615 B2 * 11/2004 Barrall et al. ............... 709/227
6,857,012 B2 * 2/2005 Sim et al. ................... 709/222

* cited by examiner

*Primary Examiner*—John Follansbee
*Assistant Examiner*—Saket K Daftuar
(74) *Attorney, Agent, or Firm*—Frommer Lawrence & Haug LLP; William S. Frommer; Thomas F. Presson

(57) ABSTRACT

In an AV-data transfer system, AV data stored in a RAID embedded in an AV server is supplied to a client personal computer connected to a network such as the Internet or an intranet by way of the network, and AV data output by the client personal computer is transmitted to the AV server through the network to be stored in the RAID. The AV server makes accesses to the RAID to write and read out data into and from the RAID. In addition to the AV server, the AV-data transfer system also includes another personal computer for exchanging AV data with the client personal computer and receiving a variety of commands from the client personal computer by way of the network in accordance with an FTP (File Transfer Protocol). As a result, it is possible to fast handle access requests made by a larger number of client personal computers.

17 Claims, 13 Drawing Sheets

US 7,451,192 B2

DATA COMMUNICATION APPARATUS AND METHOD, DATA COMMUNICATION SYSTEM, INFORMATION-PROCESSING APPARATUS AND METHOD, RECORDING MEDIUM, AND PROGRAM

BACKGROUND OF THE INVENTION

In general, the present invention relates to a data communication apparatus, a data communication method, a data communication system, an information-processing apparatus, an information-processing method, recording mediums and programs. More particularly, the present invention relates to a data communication apparatus, a data communication method, a data communication system, an information-processing apparatus and an information-processing method, which are appropriate for use in communication of data through an information recording medium having a large storage capacity and through a network, relates to programs for implementing the data communication method and the information-processing method and relates to recording mediums for storing the programs.

When AV data is communicated among client personal computers 4 through a large-capacity information recording medium such as RAID (Redundant Array of Independent Disks) 1 and through a network 3 such as the Internet and an intranet as shown in FIG. 1, there is conceived the use of a system employing a server personal computer 2 for controlling accesses to the RAID 1 and processing requests for an access to the RAID 1, which are made by the client personal computers 4.

The RAID 1 for storing AV data is connected to the network 3 through the personal computer (PC) 2. Connected to the network 3, a personal computer 4 is capable of making a request for an access to the RAID 1.

The personal computer 2 processes accesses to the RAID 1 and transfers of data through the network 3. To put it concretely, when the personal computer 4 makes a request for a transfer of AV data stored in the RAID 1 by way of the network 3, the personal computer 2 accepts the request, subsequently makes an access to the RAID 1 to acquire the requested AV data and temporarily stores the data in a memory embedded in the personal computer 2 before transferring the data to the personal computer 4 by way of the network 3.

As described above, the personal computer 2 processes accesses to the RAID 1 and transfers of data through the network 3. Thus, when requests for such an access are made by a plurality of personal computers 4 through the network 3 at the same time, it is necessary for the personal computer 2 to process the accesses to the RAID 1 and a plurality of data transfers by way of the network 3 concurrently. However, the personal computer 2 is not capable of processing both the accesses and the data transfers at the same time. As a result, there is a limit on the number of accesses that can be handled and there is thus raised a problem of a reduced processing speed.

SUMMARY OF THE INVENTION

It is thus an object of the present invention addressing the problem described above to implement a data communication system capable of handling a larger number of accesses to a RAID quickly by employing a plurality of apparatuses for independently processing such accesses and transfers of data by way of a network.

A data communication apparatus provided by the present invention is characterized in that the data communication apparatus comprises:

an acceptance means for accepting a request for a communication through a network from a terminal connected to the network;

a communication means for communicating data with the connected terminal by way of the network;

an issuance means for issuing an access command and a control command to a data storage unit in accordance with a request for a communication received by the acceptance means;

a holding means for holding an access command issued by the issuance means, data received from the terminal and data to be transmitted to the terminal;

a first control means for controlling the acceptance means, the communication means, the issuance means and the holding means;

a control-command-buffering means for buffering a control command issued by the issuance means;

a fetching means for fetching a control command buffered in the control-command-buffering means;

an acquisition means for acquiring an access command held by the holding means in accordance with a control command fetched by the fetching means;

an output means for outputting an access command acquired by the acquisition means to the data storage unit;

a data-buffering means for buffering data to be stored in the data storage unit or data read out from the data storage unit;

a transfer means for transferring data between the holding means and the data-buffering means in accordance with a control command fetched by the fetching means; and a second control means for controlling the control-command-buffering means, the fetching means, the acquisition means, the output means, the data-buffering means and transfer means, wherein the first and second control means operate independently of each other.

A RAID can be used as the data storage unit.

A data communication method provided by the present invention is characterized in that the data communication method comprises:

an acceptance step of accepting a request for a communication through a network from a terminal connected to the network;

a communication step of communicating data with the connected terminal by way of the network;

an issuance step of issuing an access command and a control command to a data storage unit in accordance with a request for a communication received in processing carried out at the acceptance step;

a holding step of holding an access command issued in processing carried out at the issuance step, data received from the terminal and data to be transmitted to the terminal;

a first control step of controlling pieces of processing carried out at the acceptance step, the communication step, the issuance step and the holding step;

a control-command-buffering step of buffering a control command issued in the processing carried out at the issuance step;

a fetching step of fetching a control command buffered in processing carried out at the control-command-buffering step;

an acquisition step of acquiring an access command held in the processing carried out at the holding step in accordance with a control command fetched in processing carried out at the fetching step;

an output step of outputting an access command acquired in processing carried out at the acquisition step to the data storage unit;

a data-buffering step of buffering data to be stored in the data storage unit or data read out from the data storage unit;

a transfer step of transferring data between the processing carried out at the holding step and processing carried out at the data-buffering step in accordance with a control command fetched in the processing carried out at the fetching step; and a second control step of controlling pieces of processing carried out at the control-command-buffering step, the fetching step, the acquisition step, the output step, the data-buffering step and transfer step, wherein pieces of processing at the first and second control steps are carried out independently of each other.

A first recording medium provided by the present invention is characterized in that the first recording medium is used for storing a program comprising:

an acceptance step of accepting a request for a communication through a network from a terminal connected to the network;

a communication step of communicating data with the connected terminal by way of the network;

an issuance step of issuing an access command and a control command to a data storage unit in accordance with a request for a communication received in processing carried out at the acceptance step;

a holding step of holding an access command issued in processing carried out at the issuance step, data received from the terminal and data to be transmitted to the terminal;

a first control step of controlling pieces of processing carried out at the acceptance step, the communication step, the issuance step and the holding step;

a control-command-buffering step of buffering a control command issued in the processing carried out at the issuance step;

a fetching step of fetching a control command buffered in processing carried out at the control-command-buffering step;

an acquisition step of acquiring an access command held in the processing carried out at the holding step in accordance with a control command fetched in processing carried out at the fetching step;

an output step of outputting an access command acquired in processing carried out at the acquisition step to the data storage unit;

a data-buffering step of buffering data to be stored in the data storage unit or data read out from the data storage unit;

a transfer step of transferring data between the processing carried out at the holding step and processing carried out at the data-buffering step in accordance with a control command fetched in the processing carried out at the fetching step; and a second control step of controlling pieces of processing carried out at the control-command-buffering step, the fetching step, the acquisition step, the output step, the data-buffering step and transfer step, wherein pieces of processing at the first and second control steps are carried out independently of each other.

A first program provided by the present invention is characterized in that the first program comprises:

an acceptance step of accepting a request for a communication through a network from a terminal connected to the network;

a communication step of communicating data with the connected terminal by way of the network;

an issuance step of issuing an access command and a control command to a data storage unit in accordance with a request for a communication received in processing carried out at the acceptance step;

a holding step of holding an access command issued in processing carried out at the issuance step, data received from the terminal and data to be transmitted to the terminal;

a first control step of controlling pieces of processing carried out at the acceptance step, the communication step, the issuance step and the holding step;

a control-command-buffering step of buffering a control command issued in the processing carried out at the issuance step;

a fetching step of fetching a control command buffered in processing carried out at the control-command-buffering step;

an acquisition step of acquiring an access command held in the processing carried out at the holding step in accordance with a control command fetched in processing carried out at the fetching step;

an output step of outputting an access command acquired in processing carried out at the acquisition step to the data storage unit;

a data-buffering step of buffering data to be stored in the data storage unit or data read out from the data storage unit;

a transfer step of transferring data between the processing carried out at the holding step and processing carried out at the data-buffering step in accordance with a control command fetched in the processing carried out at the fetching step; and a second control step of controlling pieces of processing carried out at the control-command-buffering step, the fetching step, the acquisition step, the output step, the data-buffering step and transfer step, wherein pieces of processing at the first and second control steps are carried out independently of each other.

A data communication system provided by the present invention is characterized in that the data communication system comprises a first information-processing apparatus for communicating data with a terminal connected to a network by way of the network and a second information-processing apparatus for controlling accesses to a data storage unit wherein:

the first information-processing apparatus comprises:

an acceptance means for accepting a request for a communication through the network from the terminal connected to the network;

a communication means for communicating data with the connected terminal by way of the network;

an issuance means for issuing an access command and a control command to the data storage unit in accordance with a request for a communication received by the acceptance means;

a holding means for holding an access command issued by the issuance means, data received from the terminal and data to be transmitted to the terminal; and a supplying means for supplying a control command issued by the issuance means to the second information-processing apparatus; whereas the second information-processing apparatus comprises:

a control-command-buffering means for buffering a control command received from the supplying means;

a fetching means for fetching a control command buffered in the control-command-buffering means;

an acquisition means for acquiring an access command held by the holding means in accordance with a control command fetched by the fetching means;

an output means for outputting an access command acquired by the acquisition means to the data storage unit;

a data-buffering means for buffering data to be stored in the data storage unit or data read out from the data storage unit; and a transfer means for transferring data between the holding means and the data-buffering means in accordance with a control command fetched by the fetching means.

A RAID can be used as the data storage unit.

A first information-processing apparatus provided by the present invention is characterized in that the first information-processing apparatus comprises:

an acceptance means for accepting a request for a communication through a network from a terminal connected to the network;

a communication means for communicating data with the connected terminal by way of the network;

an issuance means for issuing an access command and a control command to a data storage unit in accordance with a request for a communication received by the acceptance means;

a holding means for holding an access command issued by the issuance means, data received from the terminal and data to be transmitted to the terminal; and a supplying means for supplying a control command issued by the issuance means to another information-processing apparatus for controlling the data storage unit.

A RAID can be used as the data storage unit.

A first information-processing method provided by the present invention is characterized in that the first information-processing method comprises:

an acceptance step of accepting a request for a communication through a network from a terminal connected to the network;

a communication step of communicating data with the connected terminal by way of the network;

an issuance step of issuing an access command and a control command to a data storage unit in accordance with a request for a communication received in processing carried out at the acceptance step;

a holding step of holding an access command issued in processing carried out at the issuance step, data received from the terminal and data to be transmitted to the terminal; and a supplying step of supplying a control command issued in the processing carried out at the issuance step to another information-processing apparatus for controlling the data storage unit.

A second recording medium provided by the present invention is characterized in that the second recording medium is used for storing a program comprising:

an acceptance step of accepting a request for a communication through a network from a terminal connected to the network;

a communication step of communicating data with the connected terminal by way of the network;

an issuance step of issuing an access command and a control command to a data storage unit in accordance with a request for a communication received in processing carried out at the acceptance step;

a holding step of holding an access command issued in processing carried out at the issuance step, data received from the terminal and data to be transmitted to the terminal; and a supplying step of supplying a control command issued in the processing carried out at the issuance step to another information-processing apparatus for controlling the data storage unit.

A second program provided by the present invention is characterized in that the second program comprises:

an acceptance step of accepting a request for a communication through a network from a terminal connected to the network;

a communication step of communicating data with the connected terminal by way of the network;

an issuance step of issuing an access command and a control command to a data storage unit in accordance with a request for a communication received in processing carried out at the acceptance step;

a holding step of holding an access command issued in processing carried out at the issuance step, data received from the terminal and data to be transmitted to the terminal; and a supplying step of supplying a control command issued in the processing carried out at the issuance step to another information-processing apparatus for controlling the data storage unit.

A second information-processing apparatus provided by the present invention is characterized in that the second information-processing apparatus comprises:

a control-command-buffering means for buffering a control command received from another information-processing apparatus;

a fetching means for fetching a control command buffered in the control-command-buffering means;

an acquisition means for acquiring an access command held by the other information-processing apparatus from the other information-processing apparatus in accordance with a control command fetched by the fetching means;

an output means for outputting an access command acquired by the acquisition means to a data storage unit;

a data-buffering means for buffering data to be stored in the data storage unit or data read out from the data storage unit; and a transfer means for transferring data between the other information-processing apparatus and the data-buffering means in accordance with a control command fetched by the fetching means.

A RAID can be used as the data storage unit.

A second information-processing method provided by the present invention is characterized in that the second information-processing method comprises:

a control-command-buffering step of buffering a control command received from another information-processing apparatus;

a fetching step of fetching a control command buffered in processing carried out at the control-command-buffering step;

an acquisition step of acquiring an access command held by the other information-processing apparatus from the other information-processing apparatus in accordance with a control command fetched in processing carried out at the fetching step;

an output step of outputting an access command acquired in processing carried out at the acquisition step to a data storage unit;

a data-buffering step of buffering data to be stored in the data storage unit or data read out from the data storage unit; and a transfer step of transferring data between the other information-processing apparatus and processing carried out at the data-buffering step in accordance with a control command fetched in the processing carried out at the fetching step.

A third recording medium provided by the present invention is characterized in that the third recording medium is used for storing a program comprising:

a control-command-buffering step of buffering a control command received from another information-processing apparatus;

a fetching step of fetching a control command buffered in processing carried out at the control-command-buffering step;

an acquisition step of acquiring an access command held by the other information-processing apparatus from the other information-processing apparatus in accordance with a control command fetched in processing carried out at the fetching step;

an output step of outputting an access command acquired in processing carried out at the acquisition step to a data storage unit;

a data-buffering step of buffering data to be stored in the data storage unit or data read out from the data storage unit; and a transfer step of transferring data between the other information-processing apparatus and processing carried out at the data-buffering step in accordance with a control command fetched in the processing carried out at the fetching step.

A third program provided by the present invention is characterized in that the third program comprises:

a control-command-buffering step of buffering a control command received from another information-processing apparatus;

a fetching step of fetching a control command buffered in processing carried out at the control-command-buffering step;

an acquisition step of acquiring an access command held by the other information-processing apparatus from the other information-processing apparatus in accordance with a control command fetched in processing carried out at the fetching step;

an output step of outputting an access command acquired in processing carried out at the acquisition step to a data storage unit;

a data-buffering step of buffering data to be stored in the data storage unit or data read out from the data storage unit; and a transfer step of transferring data between the other information-processing apparatus and processing carried out at the data-buffering step in accordance with a control command fetched in the processing carried out at the fetching step.

In the data communication apparatus, the data communication method and the first program, which are provided by the present invention, a request for a communication is accepted through a network from a terminal connected to the network;

data is communicated with the connected terminal by way of the network;

an access command and a control command are issued to a data storage unit in accordance with a received request for a communication;

an issued access command, data received from the terminal and data to be transmitted to the terminal are held in a holding means;

the processing of accepting a request for a communication, the processing of communicating data, the processing of issuing an access command and a control command to the data storage unit as well as the processing of holding an issued access command, data received from the terminal and data to be transmitted to the terminal are controlled by a first control means;

an issued control command is stored in a command buffer;

a control command is fetched from the command buffer;

an access command is acquired from the holding means in accordance with a control command fetched from the command buffer;

an acquired access command is output to the data storage unit;

data to be stored in the data storage unit or data read out from the data storage unit is stored in a data buffer;

data is transferred between the holding means and the data buffer in accordance with a control command fetched from the command buffer; and the processing of storing of a control command in the command buffer, the processing of fetching a control command from the command buffer, the processing of acquiring an access command from the holding means, the processing of outputting an access command to the data storage unit, the processing of storing data in the data buffer and the processing of transferring data between the holding means and the data buffer are controlled by a second control means.

It should be noted that the first and second control means are executed independently of each other.

As a result, it is possible to fast handle access requests made by a larger number of terminals.

In the first information-processing apparatus employed in the data communication system provided by the present invention, a request for a communication is accepted through a network from a terminal connected to the network;

data is communicated with the connected terminal by way of the network;

an access command and a control command are issued to a data storage unit in accordance with a received request for a communication;

an issued access command, data received from the terminal and data to be transmitted to the terminal are held in a holding means; and an issued control command is supplied to the second information-processing apparatus.

On the other hand, in the second information-processing apparatus employed in the data communication system, an issued control command is stored in a command buffer;

a control command is fetched from the command buffer;

an access command is acquired from the holding means in accordance with a control command fetched from the command buffer;

an acquired access command is output to the data storage unit;

data to be stored in the data storage unit or data read out from the data storage unit is stored in a data buffer; and data is transferred between the holding means and the data buffer in accordance with a control command fetched from the command buffer.

As a result, it is possible to fast handle access requests made by a larger number of terminals.

In the first information-processing apparatus, the first information-processing method and the second program, which are provided by the present invention, a request for a communication is accepted through a network from a terminal connected to the network;

data is communicated with the connected terminal by way of the network;

an access command and a control command are issued to a data storage unit in accordance with a received request for a communication;

an issued access command, data received from the terminal and data to be transmitted to the terminal are held in a holding means; and an issued control command is supplied to another information-processing apparatus for controlling the data storage unit.

As a result, it is possible to fast handle access requests made by a larger number of terminals.

In the second information-processing apparatus, the second information-processing method and the third program, which are provided by the present invention, a control command received from another information-processing apparatus is stored in a command buffer;

a control command is fetched from the command buffer;

an access command held by the other information-processing apparatus is acquired from the other information-processing apparatus in accordance with a control command fetched from the command buffer;

an acquired access command is output to the data storage unit;

data to be stored in the data storage unit or data read out from the data storage unit is stored in a data buffer; and data is transferred between the other information-processing apparatus and the data buffer in accordance with a control command fetched from the command buffer.

As a result, it is possible to fast handle access requests made by a larger number of terminals.

The above and other objects, features and advantages of the present invention will become apparent from the following description and the appended claims, taken in conjunction with the accompanying drawings in which like parts or elements denoted by like reference symbols.

DETAILED DESCRIPTION OF THE PREFERRED EMBODIMENTS

Figure 1:
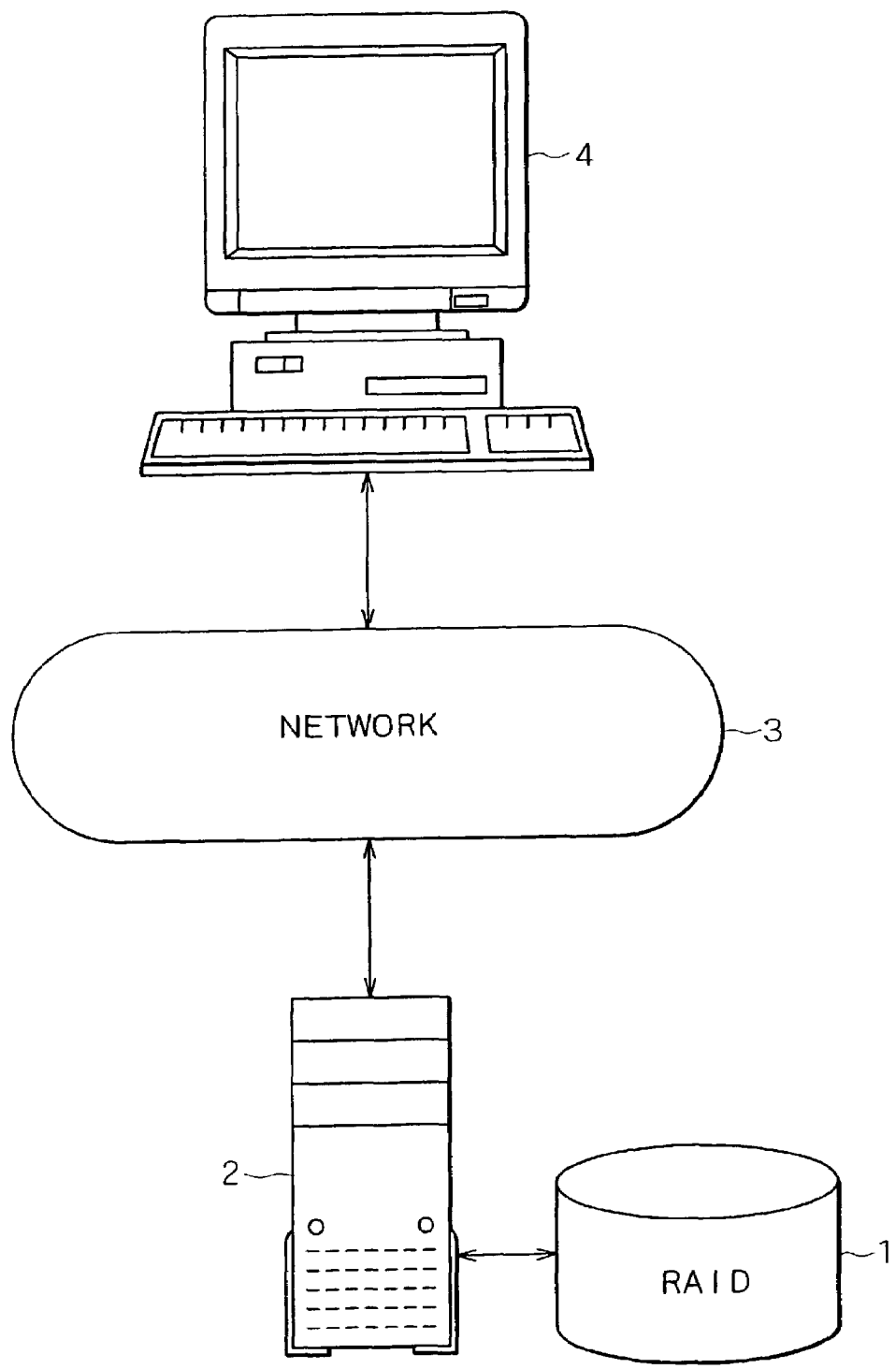
FIG. 1 is a block diagram showing a typical conventional system for transferring data through a network.
Figure 2:
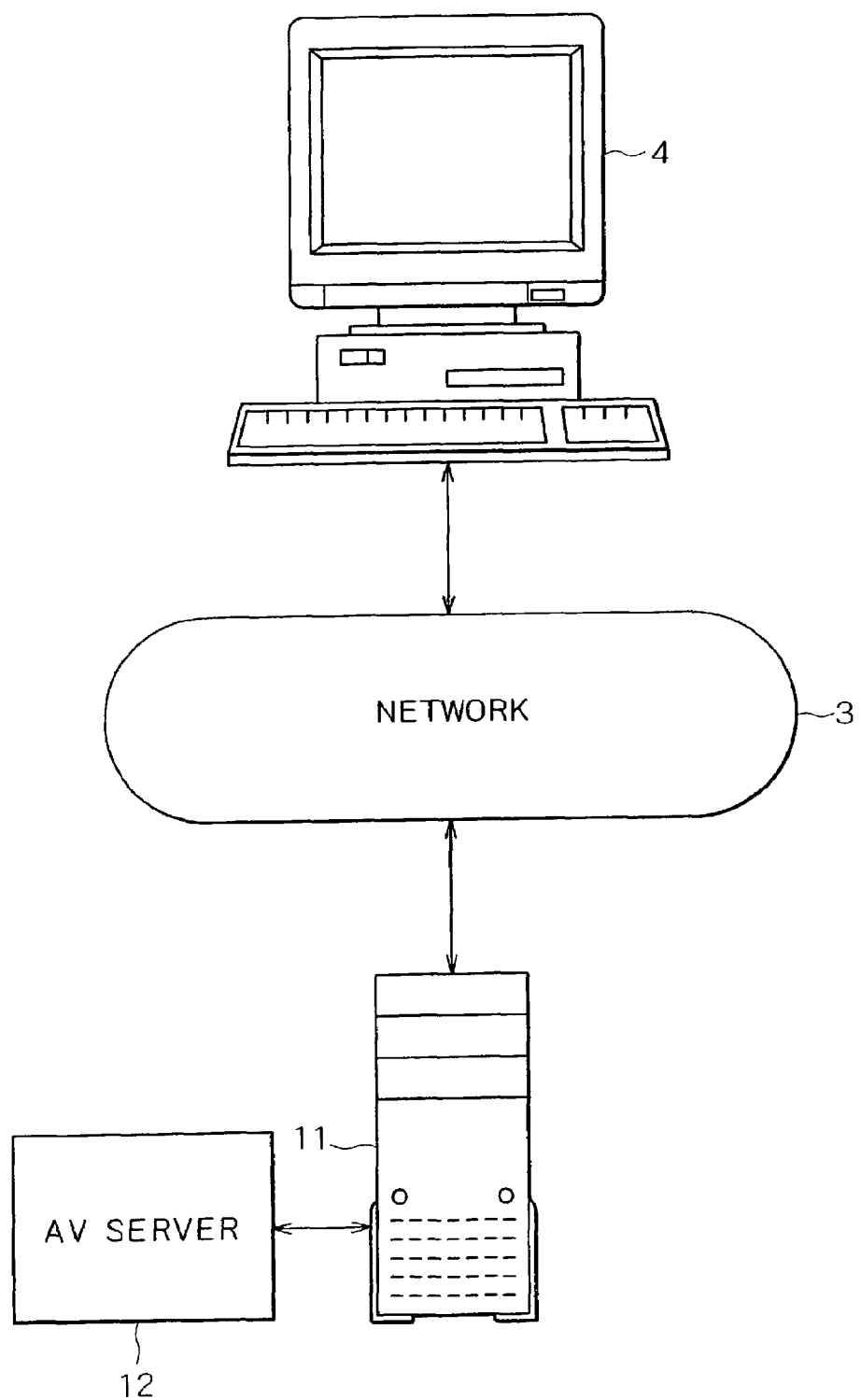
FIG. 2 is a block diagram showing a typical configuration of an AV-data transfer system implemented by an embodiment of the present invention.

An AV-data transfer system provided by the present invention is explained by referring to FIG. 2. The AV-data transfer system supplies AV data stored in a RAID 43 shown in FIG. 4 to a personal computer 4 connected to a network 3 such as the Internet or an intranet by way of the network 3. On the other hand, the AV-data transfer system also receives AV data output from the personal computer 4 and stores the data into the RAID 43 through the network 3.

Figure 4:
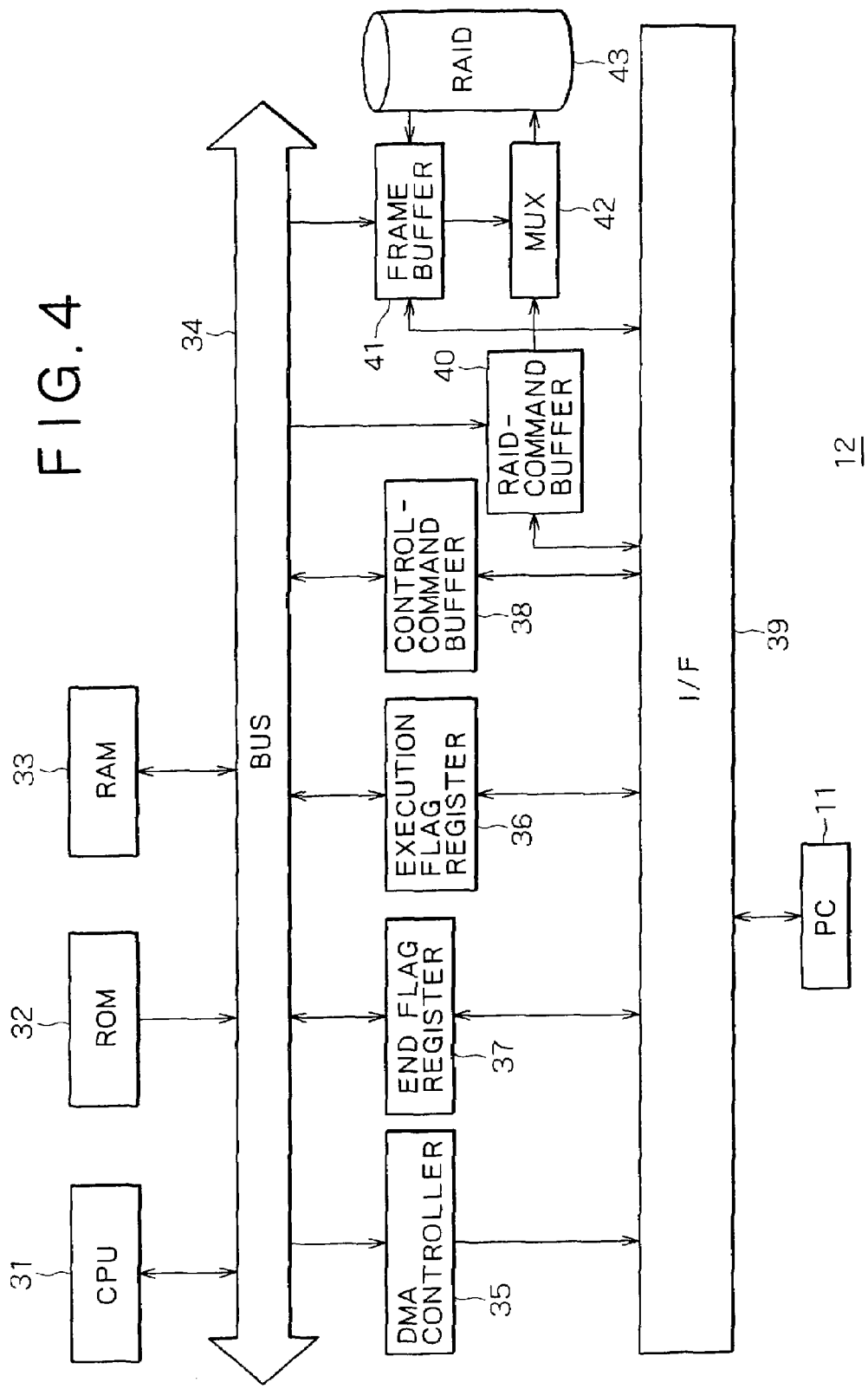
FIG. 4 is a block diagram showing a typical configuration of the AV server in FIG. 2.

The AV-data transfer system comprises a personal computer 11 and an AV server 12. The personal computer 11 exchanges AV data with the personal computer 4 and receives a variety of commands from the personal computer 4 through the network 3 in accordance with an FTP (File Transfer Protocol). As shown in FIG. 4, the AV server 12 has the RAID 43 incorporated therein. The AV server 12 makes accesses to the RAID 43 to read out and write data from and into the RAID 43.

Figure 3:
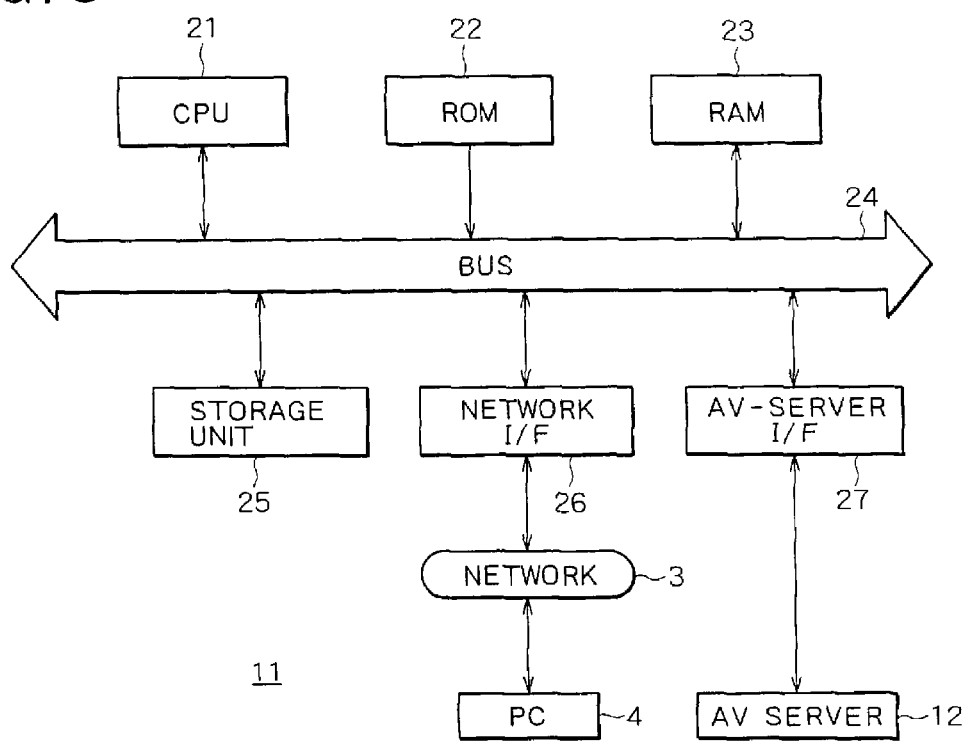
FIG. 3 is a block diagram showing a typical configuration of a personal computer on the AV server side in FIG. 2.

FIG. 3 is a diagram showing a typical configuration of the personal computer 11. The personal computer 11 includes a CPU (Central Processing Unit) 21 for controlling file transfer processing by execution of a predetermined program. The file transfer processing will be described later in detail. The CPU 21 is connected to a bus 24. The bus 24 is connected to a ROM (Read-Only Memory) 22 and a RAM (Random Access Memory) 23. The ROM 22 is used for storing programs including a BIOS (Basic Input Output System), which is executed at an activation time. On the other hand, the RAM 23 is used for temporarily storing a program and various kinds of data.

In addition, the bus 24 is also connected to a storage unit 25, a network interface (I/F) 26 and an AV-server interface (I/F) 27. The storage unit 25 typically includes a hard-disk drive for storing programs and AV data. The network interface 26 is used for communicating AV data with the personal computer 4 and receiving a variety of commands from the personal computer 4 through the network 3 in accordance with a TCP/IP (Transmission Control Protocol/Internet Protocol). Connected to the AV server 12, the AV-server interface 27 communicates a variety of commands and AV data with the AV server 12.

As described above, the CPU 21 employed in the personal computer 11 carries out file transfer processing by execution of a program installed in the hard-disk drive included in the storage unit 25. The program is loaded from the storage unit 25 into the RAM 23 in accordance with a command issued by the CPU 21 at the end of activation of the personal computer 11.

FIG. 4 is a diagram showing a typical configuration of the AV server 12. The AV server 12 includes a CPU 31 for controlling processing to be described later by execution of a program stored in a ROM 32 in accordance with a control command stored in a control-command buffer 38. The CPU 31 is connected to a bus 34. The bus 34 is connected to a ROM 32 and a RAM 33. The ROM 32 is used for storing programs to be executed by the CPU 31. The RAM 33 serves as a work area of program execution and is used for storing a file system. The file system is information showing a relation between file names and addresses of sectors in the RAID 43, which are used for storing data of the files indicated by the file names.

The bus 34 is also connected to a DMA (Direct Memory Access) controller 35 controlled by the CPU 31, an execution flag register 36, an end flag register 37, the control-command buffer 38, a RAID-command buffer 40 and a frame buffer 41.

The DMA controller 35 controls DMA transfers of control commands through an interface (I/F) 39 between the personal computer 11 and the control-command buffer 38, DMA transfers of RAID commands through the interface 39 between the personal computer 11 and the RAID-command buffer 40 and DMA transfers of data through the interface 39 between the personal computer 11 and the frame buffer 41. A DMA transfer is a transfer of a command or data by adoption of the so-called DMA technique.

The execution flag register 36 is a flag for storing information indicating completion of an processing carried out by the personal computer 11 to write control commands into the control-command buffer 38 through the interface 39.

The end flag register 37 is a flag for storing information indicating completion of all processing carried out by the CPU 31 in accordance with control commands stored in the control-command buffer 38.

The control-command buffer 38 is used for storing control commands, which were each transferred by the personal computer 11 to the control-command buffer 38 by way of the interface 39 by adopting the DMA technique.

To be more specific, the control-command buffer 38 is used for storing 6 different control commands, namely, DMA-Command-Down, DMA-Data-Down, DMA-Data-Up, RAID-Command-Down, RAID-Data-Down and RAID-Data-Up, which are explained as follows.

DMA-Command-Down is a control command for driving the DMA controller 35 employed in the AV server 12 to carry out a DMA transfer of a RAID command from the RAM 23 employed in the personal computer 11 to the RAID-command buffer 40 employed in the AV server 12.

DMA-Data-Down is a control command for driving the DMA controller 35 employed in the AV server 12 to carry out a DMA transfer of AV data from the RAM 23 employed in the personal computer 11 to the frame buffer 41 employed in the AV server 12.

DMA-Data-Up is a control command for driving the DMA controller 35 employed in the AV server 12 to carry out a DMA transfer of AV data from the frame buffer 41 employed in the AV server 12 to the RAM 23 employed in the personal computer 11.

RAID-Command-Down is a control command for requesting the CPU 31 employed in the AV server 12 to output a RAID command stored in the RAID-command buffer 40 to the RAID 43 by way of a multiplexer 42.

RAID-Data-Down is a control command for requesting the CPU 31 employed in the AV server 12 to output AV data stored in the frame buffer 41 to the RAID 43 by way of the multiplexer 42.

RAID-Data-Up is a control command for requesting the CPU 31 employed in the AV server 12 to read out AV data from the RAID 43 and store the data in the frame buffer 41.

Refer back to FIG. 4. The interface 39 is connected to the personal computer 11.

The RAID-command buffer 40 is used for temporarily storing RAID commands each used for controlling the RAID 43. A RAID command stored in the RAID-command buffer 40 was transferred from the personal computer 11 by way of the interface 39 by adoption of the DMA technique.

The following description explains 2 RAID commands, namely, read and write commands. A write command is a command for storing AV data supplied to the AV server 12 into the RAID 43 as a file indicated by a specified file name.

A read command is a command for reading out AV data of a file indicated by a specified file name from the RAID 43.

Refer back to FIG. 4. The frame buffer 41 is used for temporarily holding AV data transferred from the personal computer 11 by way of the interface 39 by adoption of the DMA technique before storing the AV data into the RAID 43. On the other hand, the frame buffer 41 is also used for temporarily holding AV data read out from the RAID 43 before being transferred to the personal computer 11 by way of the interface 39 by adoption of the DMA technique.

The multiplexer (MUX) 42 selects a RAID command held in the RAID-command buffer 40 or AV data held in the frame buffer 41 and stores the selected one into the RAID 43.

The RAID 43 outputs AV data read out by a read command received from the multiplexer 42 as a RAID command from a sector address associated with a specified file name to the frame buffer 41 in a read processing according to the command. On the other hand, the RAID 43 also stores AV data from the RAID 43 at a sector address associated with a specified file name in accordance with a write command received from the multiplexer 42 as a RAID command in a write processing requested by the command.

Next, the processing of the AV-data transfer system is explained by referring to flowcharts shown in FIGS. 5 to 14.

Figure 5:
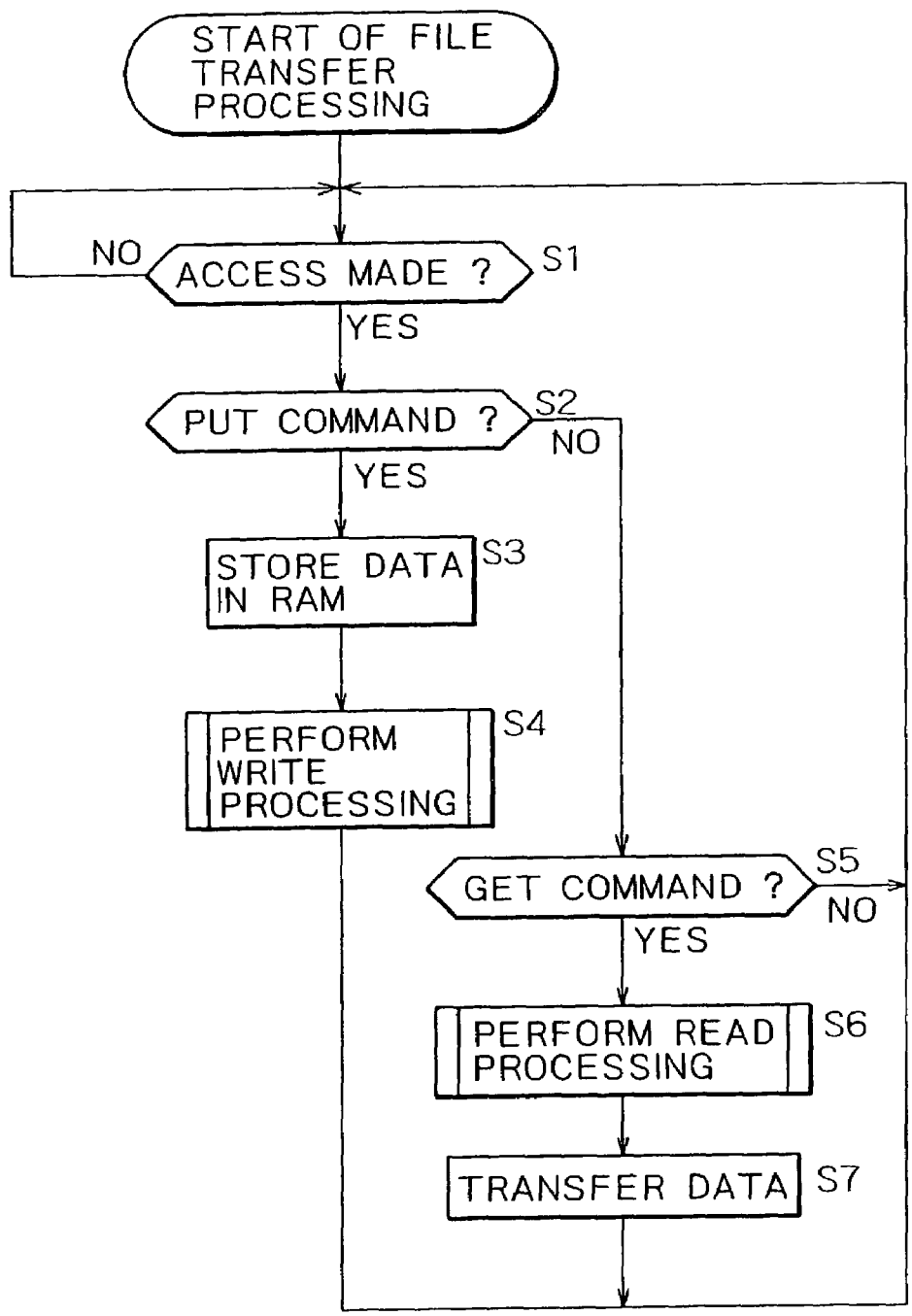
FIG. 5 is a flowchart representing file transfer processing carried out by the personal computer on the AV server side in FIG. 2.
Figure 6:
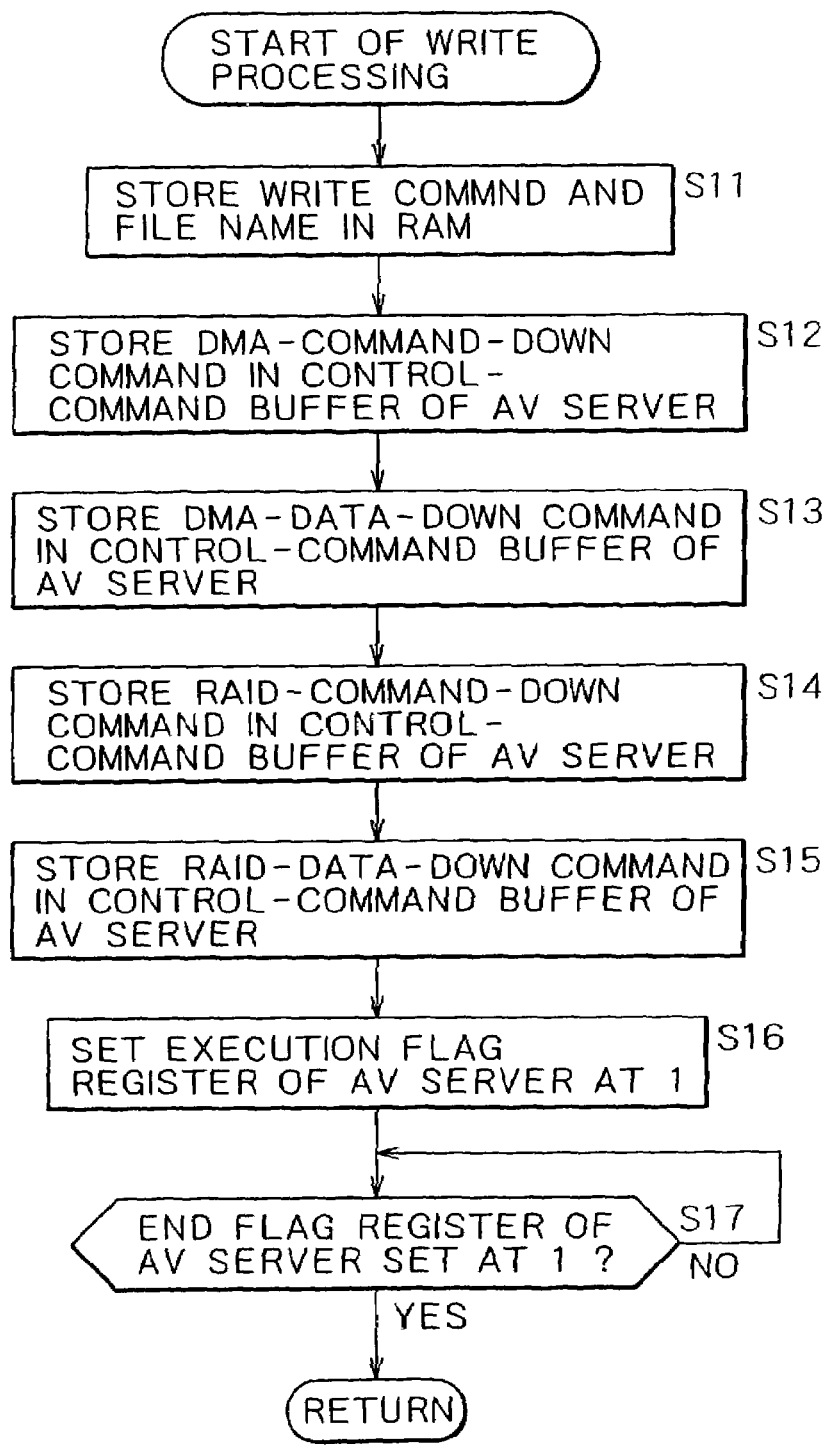
FIG. 6 is a flowchart representing a write processing carried out by a CPU shown in FIG. 3.
Figure 7:
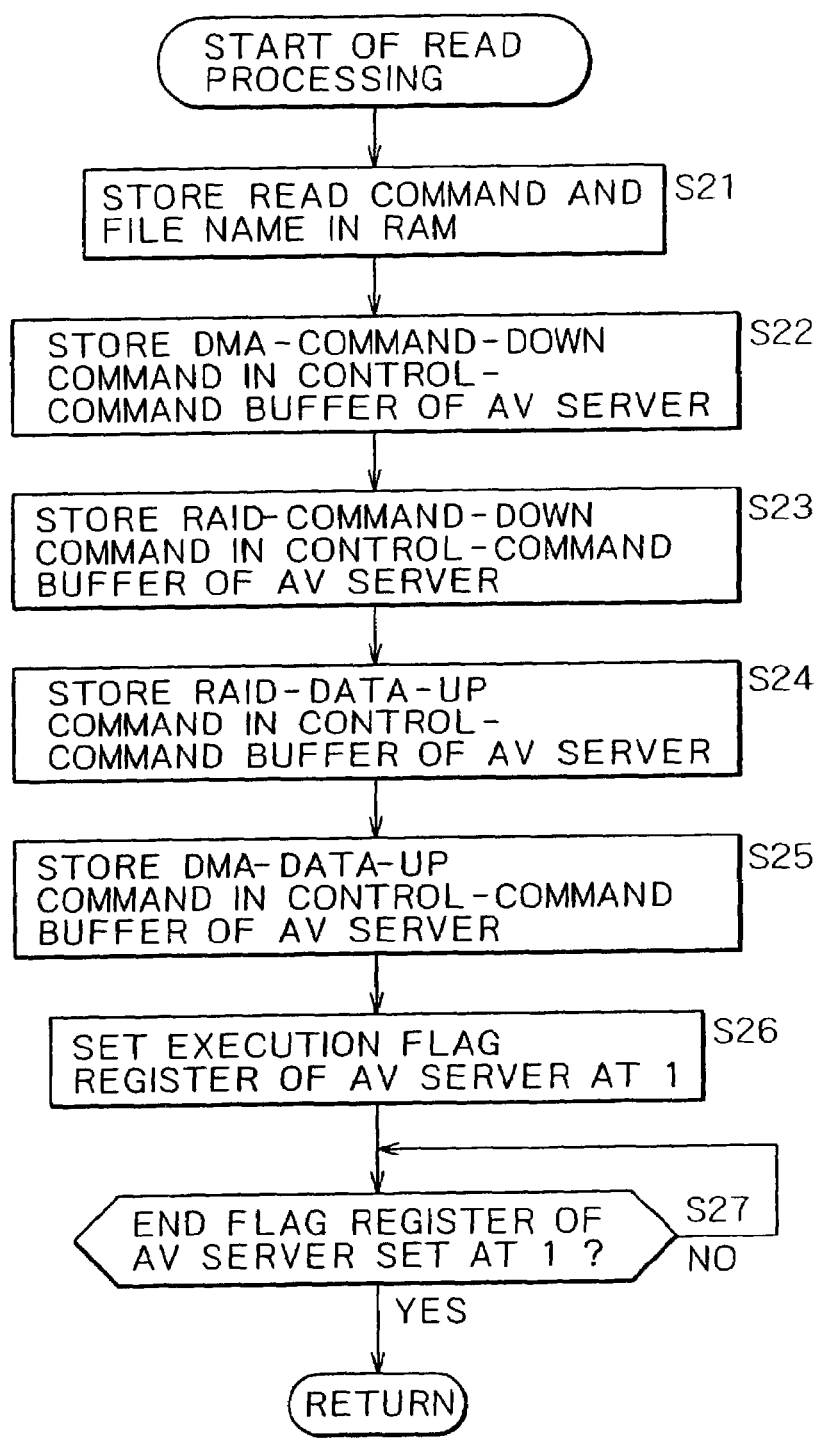
FIG. 7 is a flowchart representing a read processing carried out by the CPU.

First of all, file transfer processing carried out by the personal computer 11 is described by referring to the flowchart shown in FIG. 5. The file transfer processing is started by the CPU 21 by execution of a program stored in the ROM 22 after the personal computer 11 is activated.

At a step S1, the CPU 21 forms a judgment as to whether or not the personal computer 4 has made an access to the personal computer 11 through the network 3. The judgment is formed repeatedly till the outcome of the judgment indicates that the personal computer 4 has made an access. As the personal computer 4 makes an access, the flow of the processing goes on to a step S2.

At a step S2, the CPU 21 forms a judgment as to whether or not the access made by the personal computer 4 is a PUT command, which is a command requesting the AV data output by the personal computer 4 be stored in the AV server 12. If the outcome of the judgment indicates that the access made by the personal computer 4 is a PUT command, the flow of the processing goes on to a step S3. At the step S3, the CPU 21 controls the network interface 26 to receive AV data transmitted by the personal computer 4 through the network 3 and stores the data in the RAM 23.

Then, at the next step S4, the CPU 21 carries out a write processing to store the AV data in the AV server 12. Details of the write processing are explained by referring to the flowchart shown in FIG. 6. At a step S11, the CPU 21 generates a write command, which is one of RAID commands, and stores the write command in the RAM 23 along with a file name specified by the personal computer 4 as the name of a file into which the AV data is to be stored. Then, at the next step S12, the CPU 21 transfers a DMA-Command-Down control command to the control-command buffer 38 employed in the AV server 12 by way of the AV-server interface 27.

Subsequently, at the next step S13, the CPU 21 transfers a DMA-Data-Down control command to the control-command buffer 38 employed in the AV server 12 by way of the AV-server interface 27. Then, at the next step S14, the CPU 21 transfers a RAID-Command-Down control command to the control-command buffer 38 employed in the AV server 12 by way of the AV-server interface 27. Subsequently, at the next step S15, the CPU 21 transfers a RAID-Data-Down control command to the control-command buffer 38 employed in the AV server 12 by way of the AV-server interface 27.

Then, at the next step S16, the CPU 21 sets the execution flag register 36 employed in the AV server 12 through the AV-server interface 27 at 1 to indicate that a sequence of control commands have been stored in the control-command buffer 38. On the other hand, the CPU 21 resets the end flag register 37 employed in the AV server 12 at 0 to indicate that processing requested by the control commands has not been completed.

Subsequently, at the next step S17, the CPU 21 examines the end flag register 37 employed in the AV server 12 through the AV-server interface 27 to form a judgment as to whether or not the end flag register 37 has been set at 1 to indicate that the sequence of control commands stored in the control-command buffer 38 have all been executed. The judgment is formed repeatedly till the outcome of the judgment indicates that the end flag register 37 has been set at 1. As the outcome of the judgment indicates that the end flag register 37 has been set at 1, the write processing is finished and the flow of the processing goes back to the step S1 of the flowchart shown in FIG. 5 to repeat the processing of this step and the subsequent steps.

If the outcome of the judgment formed at the step S2 of the flowchart shown in FIG. 5 indicates that the access made by the personal computer 4 is not a PUT command, on the other hand, the flow of the processing goes on to a step S5. At the step S5, the CPU 21 forms a judgment as to whether or not the access made by the personal computer 4 is a GET command, which is a command requesting the AV server 12 to read out AV data stored in the RAID 43 and transmit the data to the personal computer 11. If the outcome of the judgment indicates that the access made by the personal computer 4 is a GET command, the flow of the processing goes on to a step S6.

At the step S6, the CPU 21 carries out a read processing to read out the AV data from the AV server 12. Details of the read processing are explained by referring to the flowchart shown in FIG. 7. At a step S21, the CPU 21 generates a read command, which is one of RAID commands, and stores the read command in the RAM 23 along with a file name specified by the personal computer 4 as the name of a file from which the AV data is to be read out. Then, at the next step S22, the CPU 21 transfers a DMA-Command-Down control command to the control-command buffer 38 employed in the AV server 12 by way of the AV-server interface 27.

Subsequently, at the next step S23, the CPU 21 transfers a RAID-Command-Down control command to the control-command buffer 38 employed in the AV server 12 by way of the AV-server interface 27. Then, at the next step S24, the CPU 21 transfers a RAID-Data-Up control command to the control-command buffer 38 employed in the AV server 12 by way of the AV-server interface 27. Subsequently, at the next step S25, the CPU 21 transfers a DMA-Data-Up control command to the control-command buffer 38 employed in the AV server 12 by way of the AV-server interface 27.

Then, at the next step S26, the CPU 21 sets the execution flag register 36 employed in the AV server 12 through the AV-server interface 27 at 1 to indicate that a sequence of control commands have been stored in the control-command buffer 38. On the other hand, the CPU 21 resets the end flag register 37 employed in the AV server 12 at 0 to indicate that processing requested by the control commands has not been completed.

Subsequently, at the next step S27, the CPU 21 examines the end flag register 37 employed in the AV server 12 through the AV-server interface 27 to form a judgment as to whether or not the end flag register 37 has been set at 1 to indicate that the sequence of control commands stored in the control-command buffer 38 have all been executed. The judgment is formed repeatedly till the outcome of the judgment indicates that the end flag register 37 has been set at 1. As the outcome of the judgment indicates that the end flag register 37 has been set at 1, the read processing is finished and the flow of the processing goes back to a step S7 of the flowchart shown in FIG. 5.

As a result of processing carried out by the AV server 12 to accompany the read processing described above, the AV data read out from the RAID 43 is stored in the RAM 23 employed in the personal computer 11. The processing carried out by the AV server 12 to accompany the read processing described above will be described later. At the step S7, the CPU 21 controls the network interface 26 to transmit the AV data stored in the RAM 23 to the personal computer 4 by way of the network 3. Then, the flow of the processing goes back to the step S1 to repeat the processing at this step and the subsequent steps.

If the outcome of the judgment formed at the step S5 indicates that the access made by the personal computer 4 is not a GET command, on the other hand, the flow of the processing goes back to the step S1 to repeat the processing at this step and the subsequent steps.

As described above, the personal computer 11 mainly exchanges AV data with the personal computer 4 through the network 3, generates a RAID command to be output to the CPU 31 employed in the AV server 12 and transfers a control command to the control-command buffer 38 employed in the AV server 12.

Figure 8:
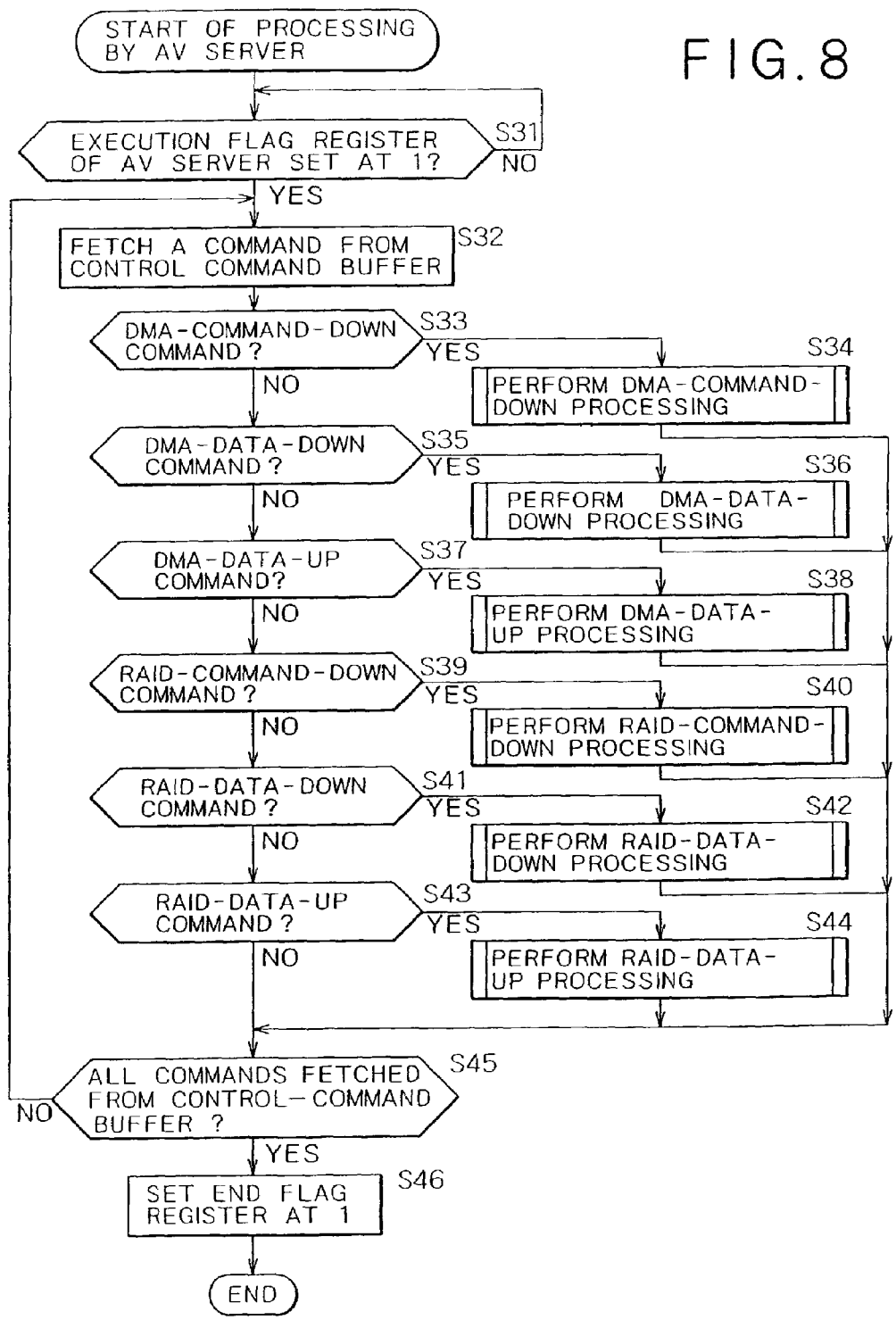
FIG. 8 is a flowchart representing file transfer processing carried out by the AV server.

By referring to a flowchart shown in FIG. 8, the following description explains processing carried out by the AV server 12 to accompany the file transfer processing, that is, the write and read processings, carried out by the personal computer 11 as described above. The processing carried out by the AV server 12 is started by execution of a program stored in the ROM 32 by the CPU 31 after the AV server 12 is activated.

At a step S31, the CPU 31 forms a judgment as to whether or not the execution flag register 36 is set at 1. The judgment is formed repeatedly till the outcome of the judgment indicates that the execution flag register 36 is set at 1. As the outcome of the judgment indicates that the execution flag register 36 is set at 1, the flow of the processing goes on to a step S32.

At the step S32, the CPU 31 fetches a control command from the control-command buffer 38 and deletes the command from the control-command buffer 38.

Then, at the next step S33, the CPU 31 forms a judgment as to whether or not the control command fetched at the step S32 is DMA-Command-Down. If the outcome of the judgment indicates that the control command fetched at the step S32 is DMA-Command-Down, the flow of the processing goes on to a step S34 to carry out DMA-Command-Down processing represented by a flowchart shown in FIG. 9. Then, the flow of the processing goes on to a step S45. It should be noted that, if the outcome of the judgment indicates that the control command fetched at the step S32 is not DMA-Command-Down, on the other hand, the flow of the processing goes on to a step S35.

At the step S35, the CPU 31 forms a judgment as to whether or not the control command fetched at the step S32 is DMA-Data-Down. If the outcome of the judgment indicates that the control command fetched at the step S32 is DMA-Data-Down, the flow of the processing goes on to a step S36 to carry out DMA-Data-Down processing represented by a flowchart shown in FIG. 10. Then, the flow of the processing goes on to the step S45. It should be noted that, if the outcome of the judgment indicates that the control command fetched at the step S32 is not DMA-Data-Down, on the other hand, the flow of the processing goes on to a step S37.

At the step S37, the CPU 31 forms a judgment as to whether or not the control command fetched at the step S32 is DMA-Data-Up. If the outcome of the judgment indicates that the control command fetched at the step S32 is DMA-Data-Up, the flow of the processing goes on to a step S38 to carry out DMA-Data-Up processing represented by a flowchart shown in FIG. 11. Then, the flow of the processing goes on to the step S45. It should be noted that, if the outcome of the judgment indicates that the control command fetched at the step S32 is not DMA-Data-Up, on the other hand, the flow of the processing goes on to a step S39.

At the step S39, the CPU 31 forms a judgment as to whether or not the control command fetched at the step S32 is RAID-Command-Down. If the outcome of the judgment indicates that the control command fetched at the step S32 is RAID-Command-Down, the flow of the processing goes on to a step S40 to carry out RAID-Command-Down processing represented by a flowchart shown in FIG. 12. Then, the flow of the processing goes on to the step S45. It should be noted that, if the outcome of the judgment indicates that the control command fetched at the step S32 is not RAID-Command-Down, on the other hand, the flow of the processing goes on to a step S41.

At the step S41, the CPU 31 forms a judgment as to whether or not the control command fetched at the step S32 is RAID-Data-Down. If the outcome of the judgment indicates that the control command fetched at the step S32 is RAID-Data-Down, the flow of the processing goes on to a step S42 to carry out RAID-Data-Down processing represented by a flowchart shown in FIG. 13. Then, the flow of the processing goes on to the step S45. It should be noted that, if the outcome of the judgment indicates that the control command fetched at the step S32 is not RAID-Data-Down, on the other hand, the flow of the processing goes on to a step S43.

At the step S43, the CPU 31 forms a judgment as to whether or not the control command fetched at the step S32 is RAID-Data-Up. If the outcome of the judgment indicates that the control command fetched at the step S32 is RAID-Data-Up, the flow of the processing goes on to a step S44 to carry out RAID-Data-Up processing represented by a flowchart shown in FIG. 14. Then, the flow of the processing goes on to the step S45. It should be noted that, if the outcome of the judgment indicates that the control command fetched at the step S32 is not RAID-Data-Up, on the other hand, the flow of the processing goes on to the step S45.

At the step S45, the CPU 31 forms a judgment as to whether or not all control commands stored in the control-command buffer 38 have been fetched. If the outcome of the judgment indicates that control commands stored in the control-command buffer 38 have not all been fetched, the flow of the processing goes back to the step S32 to repeat the processing of this step and the subsequent steps. If the outcome of the judgment formed at the step S45 indicates that control commands stored in the control-command buffer 38 have all been fetched, on the other hand, the flow of the processing goes on to a step S46.

At the step S46, the CPU 31 sets the end flag register 37 at 1 and resets the execution flag register 36 to 0.

Figure 9:
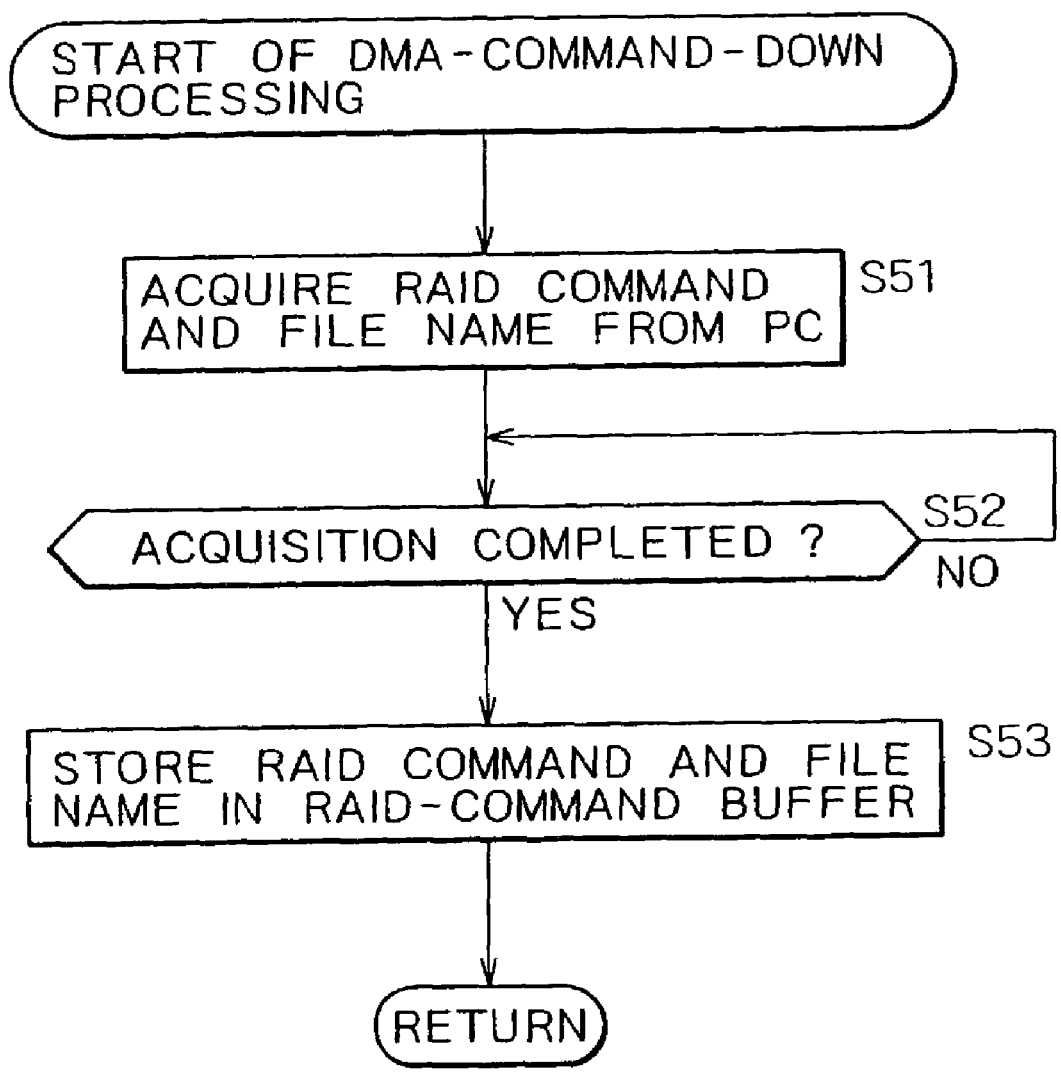
FIG. 9 is a flowchart representing DMA-Command-Down processing.

Next, by referring to the flowchart shown in FIG. 9, the following description explains the DMA-Command-Down processing carried out at the step S34. At a step S51, the CPU 31 controls the DMA controller 35 to transfer a RAID command and a file name from the RAM 23 employed in the personal computer 11 to the AV server 12 by adoption of the DMA technique. The RAID command can be a read or write command. The DMA controller 35 then starts to transfer the RAID command and the file name from the RAM 23 employed in the personal computer 11 to the AV server 12 in accordance with the control executed by the CPU 31.

Then, at the next step S52, the CPU 31 forms a judgment as to whether or not the processing carried out by the DMA controller 35 to transfer the RAID command and the file name from the RAM 23 employed in the personal computer 11 to the AV server 12 has been completed. The judgment is formed repeatedly till the outcome of the judgment indicates that the processing carried out by the DMA controller 35 to transfer the RAID command and the file name from the RAM 23 employed in the personal computer 11 to the AV server 12 has been completed. As the outcome of the judgment indicates that the processing carried out by the DMA controller 35 to transfer the RAID command and the file name from the RAM 23 employed in the personal computer 11 to the AV server 12 has been completed, the flow of the processing goes on to a step S53. At the step S53, the CPU 31 controls the DMA controller 35 to store the transferred RAID command and the transferred file names in the RAID-command buffer 40. Upon completion of the processing of this step, the DMA-Command-Down processing is finished.

Figure 10:
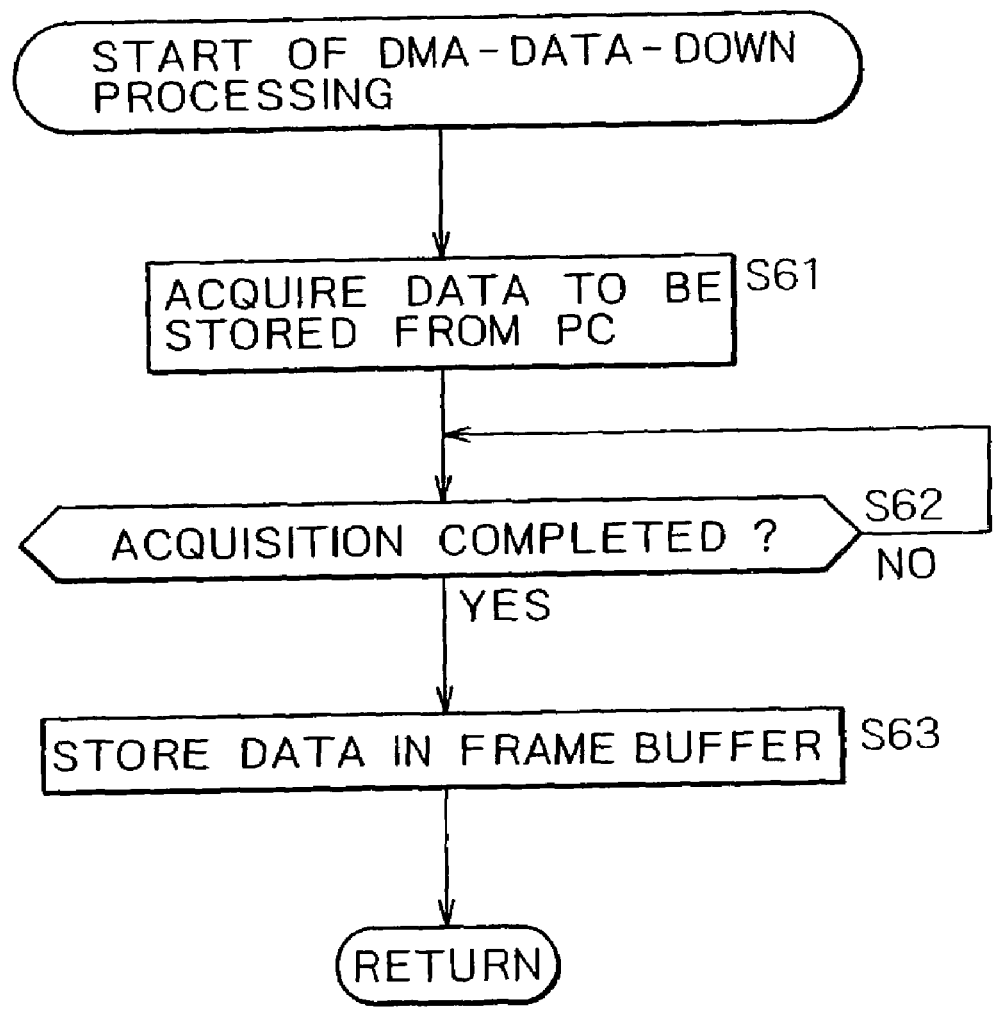
FIG. 10 is a flowchart representing DMA-Data-Down processing.

Next, by referring to the flowchart shown in FIG. 10, the following description explains the DMA-Data-Down processing carried out at the step S36. At a step S61, the CPU 31 controls the DMA controller 35 to transfer AV data from the RAM 23 employed in the personal computer 11 to the RAID 43 employed in the AV server 12 by adoption of the DMA technique. The DMA controller 35 then starts to transfer the AV data from the RAM 23 employed in the personal computer 11 to the AV server 12 in accordance with the control executed by the CPU 31.

Then, at the next step S62, the CPU 31 forms a judgment as to whether or not the processing carried out by the DMA controller 35 to transfer the AV data from the RAM 23 employed in the personal computer 11 to the AV server 12 has been completed. The judgment is formed repeatedly till the outcome of the judgment indicates that the processing carried out by the DMA controller 35 to transfer the AV data from the RAM 23 employed in the personal computer 11 to the AV server 12 has been completed. As the outcome of the judgment indicates that the processing carried out by the DMA controller 35 to transfer AV data from the RAM 23 employed in the personal computer 11 to the AV server 12 has been completed, the flow of the processing goes on to a step S63. At the step S63, the CPU 31 controls the DMA controller 35 to store the transferred AV data in the frame buffer 41. Upon completion of the processing of this step, the DMA-Data-Down processing is finished.

Figure 11:
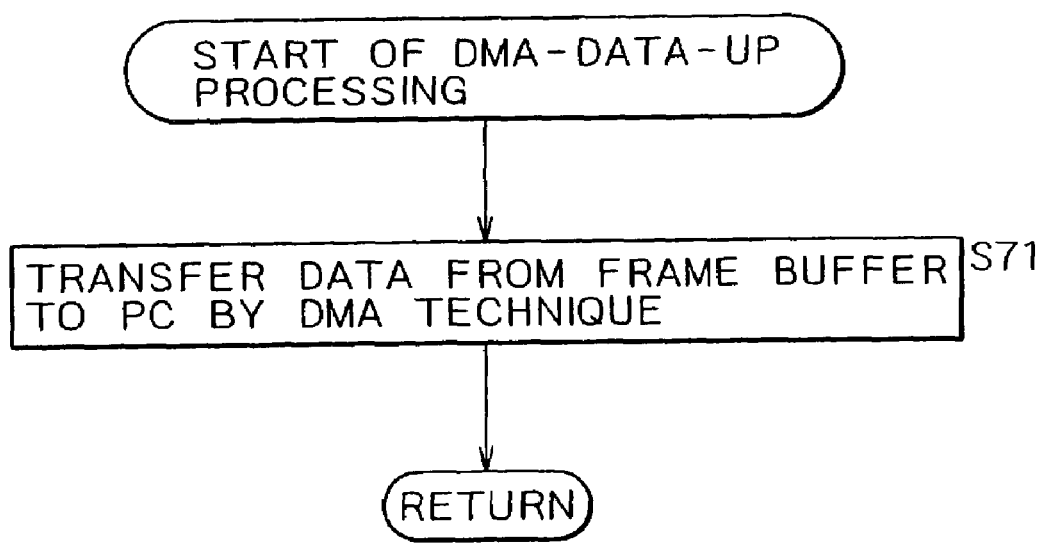
FIG. 11 is a flowchart representing DMA-Data-Up processing.

Next, by referring to the flowchart shown in FIG. 11, the following description explains the DMA-Data-Up processing carried out at the step S38. At a step S71, the CPU 31 controls the DMA controller 35 to transfer AV data read out from the RAID 43 and stored in the frame buffer 41 to the RAM 23 employed in the personal computer 11 by adoption of the DMA technique. The DMA controller 35 then starts to transfer the AV data from the frame buffer 41 to the RAM 23 employed in the personal computer 11 by adoption of the DMA technique in accordance with the control executed by the CPU 31. Upon completion of the processing of this step, the DMA-Data-Up processing is finished.

Figure 12:
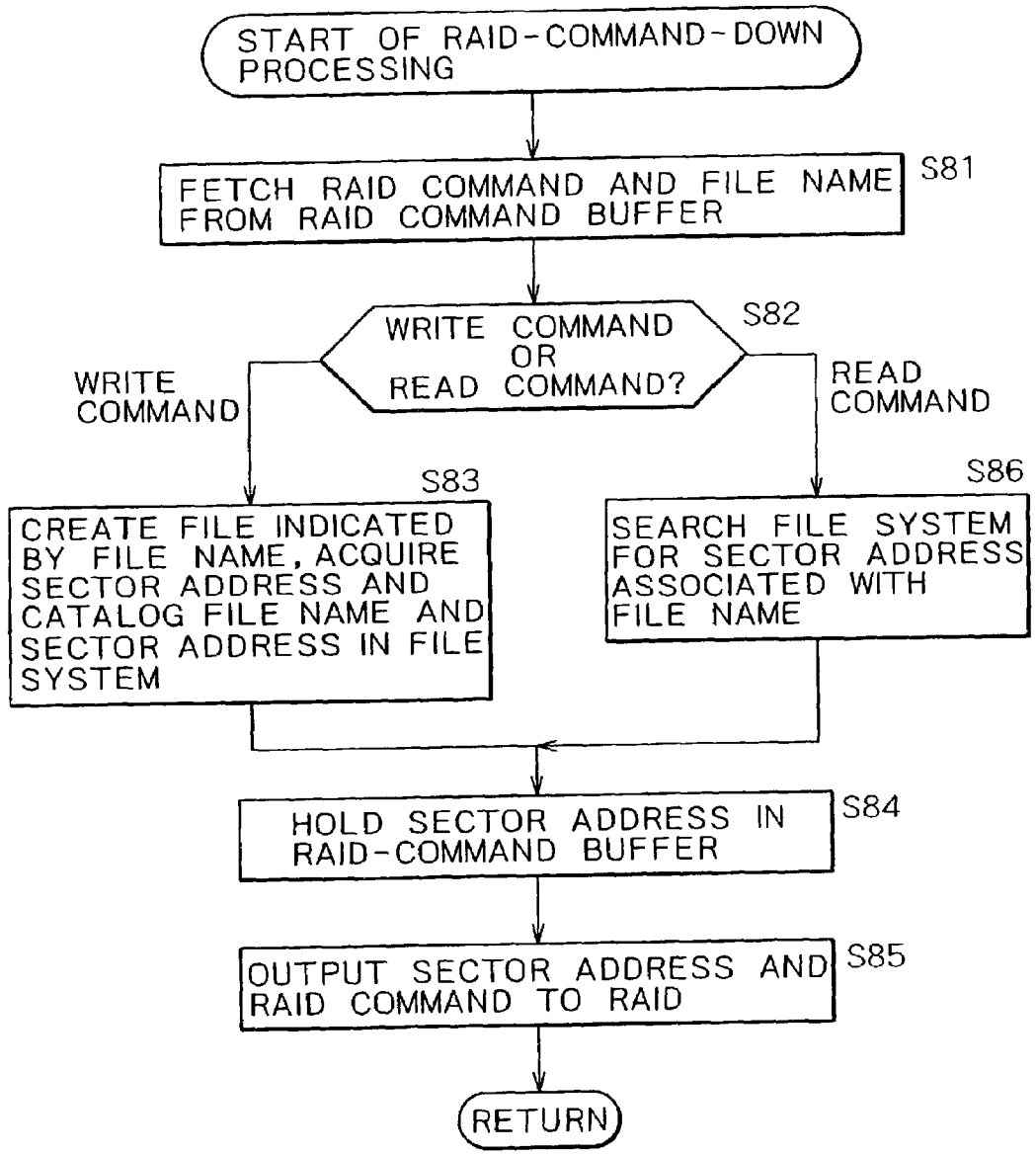
FIG. 12 is a flowchart representing RAID-Command-Down processing.

Next, by referring to the flowchart shown in FIG. 12, the following description explains the RAID-Command-Down processing carried out at the step S40. At a step S81, the CPU 31 fetches a RAID command and a file name from the RAID-command buffer 40. Then, at the next step S82, the CPU 31 forms a judgment as to whether the RAID command fetched at the step S81 is a read or write command. If the outcome of the judgment indicates that the RAID command fetched at the step S81 is a write command, the flow of the processing goes on to a step S83.

At the step S83, the CPU 31 creates a new file indicated by the file name fetched at the step S81 and allocates the address of a sector for storing AV data in the RAID 43. The CPU 31 then catalogs the file name in the file system stored in the RAM 33 by associating the file name with the address of the sector.

Then, at the next step S84, the CPU 31 stores the sector address associated with the file name in the RAID-command buffer 40. Subsequently, at the next step S85, the CPU 31 outputs the RAID command and the sector address from the RAID-command buffer 40 to the RAID 43.

If the outcome of the judgment formed at the step S82 indicates that the RAID command fetched at the step S81 is a read command, on the other hand, the flow of the processing goes on to a step S86.

At the step S86, the CPU 31 searches the file system stored in the RAM 33 for a sector address associated with the file name fetched at the step S81. The sector address is the address of a sector in the RAID 43. In this sector, AV data to be read out is stored. The flow of the processing then goes on to the step S84. Upon completion of the processing of the step S85, the RAID-Command-Down processing is finished.

Figure 13:
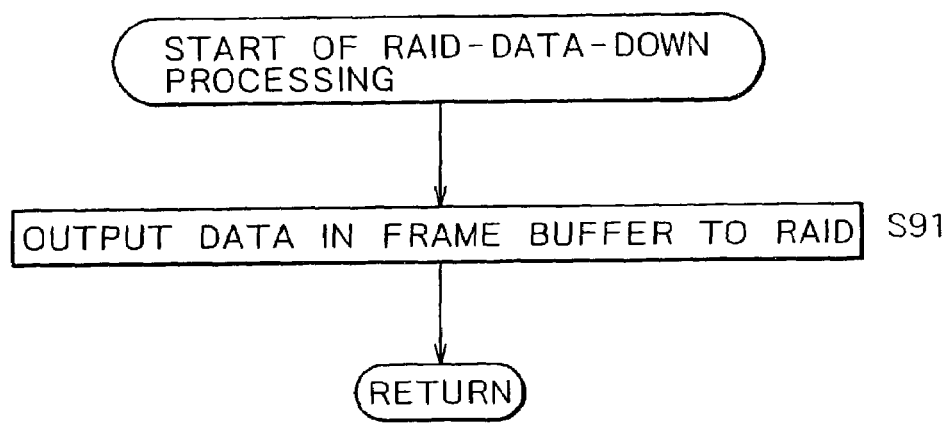
FIG. 13 is a flowchart representing RAID-Data-Down processing.

Next, by referring to the flowchart shown in FIG. 13, the following description explains the RAID-Data-Down processing carried out at the step S42. At a step S91, the CPU 31 controls the multiplexer 42 to select AV data stored in the frame buffer 41 and output the data to the RAID 43 to be stored therein. Upon completion of the processing of the step S91, the RAID-Data-Down processing is finished.

Figure 14:
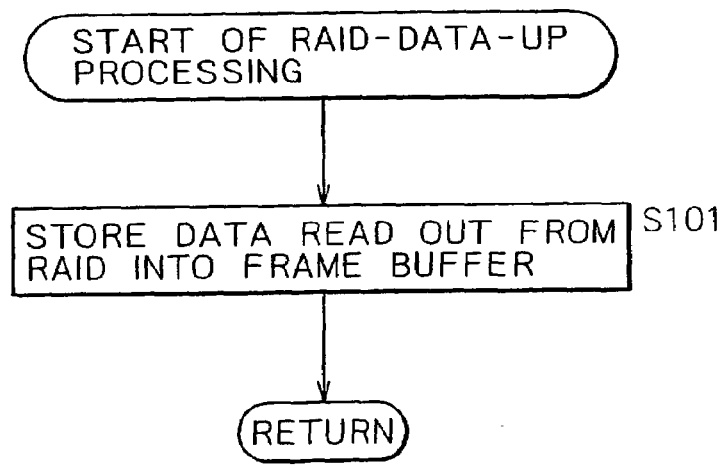
FIG. 14 is a flowchart representing RAID-Data-Up processing.

Next, by referring to the flowchart shown in FIG. 14, the following description explains the RAID-Data-Up processing carried out at the step S44. At a step S101, the CPU 31 controls the frame buffer 41 to store AV data read out from the RAID 43. Upon completion of the processing of the step S101, the RAID-Data-Up processing is finished.

As described above, the AV server 1 writes and reads out AV data into and from the RAID 43 on the basis of a control command stored in the control-command buffer 38 by the personal computer 11.

Thus, since accesses to the RAID 43 are controlled by the CPU 31 of the AV server 12 in the AV-data transfer system while AV data is exchanged with the personal computer 4 through the network 3 in accordance with control executed by the CPU 21 employed in the personal computer 11 in a manner completely independent of the CPU 31, it is possible to handle a larger number of requests for accesses made at the same time.

It should be noted that the present invention can be applied to transfers of not only AV data but also all kinds of data through a network.

In the AV-data transfer system implemented by the embodiment of the present invention, the personal computer 11 and the AV server 12 are 2 separate apparatuses. However, they can be combined and incorporated in the same cabinet as an apparatus for implementing the functions of the CPU 21, the CPU 31 and the RAID 43.

It should be noted that, in this specification, steps describing a program stored in a recording medium can of course be pieces of processing, which are carried out in a prescribed order along the time axis, but do not have to be executed sequentially. That is to say, the steps can be pieces of processing, which are carried out concurrently or individually.

In addition, the phrase data communication system and the AV-data transfer system used in this specification each mean the whole system comprising a plurality of apparatuses.

While a preferred embodiment of the present invention has been described using specific terms, such description is for illustrative purposes only, and it is to be understood that changes and variations may be made without departing from the spirit or scope of the following claims.

What is claimed is:

1. A data communication apparatus for controlling communications of data between a terminal and a data storage unit by way of a network, said data communication apparatus comprising:
    an acceptance means for accepting a request for a communication through said network from said terminal connected to said network;
    a communication means for communicating data with said terminal by way of said network;
    an issuance means for issuing an access command and a control command from an ordered plurality of control commands to said data storage unit in accordance with a request for a communication received by said acceptance means;
    a memory for temporarily holding the access command issued by said issuance unit, data received from said terminal and data to be transmitted to said terminal;
    a first controller for controlling said acceptance means, said communication means, said issuance means and said memory;
    a control-command buffering means for buffering the control command from the ordered plurality of control commands issued by said issuance means;
    a fetching means for fetching the control command buffered in said control-command buffer,
    wherein the control command is sequentially judged to be a DMA-command down, then a DMA data down, then a DMA data up, then a RAID command down, then a RAID data down, then a RAID data up;
    an acquisition means for acquiring the access command held by said holding in accordance with the control command fetched by said fetching means;
    an output for outputting the access command acquired by said acquisition means to said data storage unit;
    a data buffer for buffering data to be stored in said data storage unit or data read out from said data storage unit;
    a transfer means for transferring data between said memory and said data buffer in accordance with the control command fetched by said fetching means; and
    a second controller for controlling said control-command buffer, said fetching means, said acquisition means, said output means, said data buffer and transfer means,
    wherein said first and second control means operate independently of each other.

2. A data communication apparatus according to claim 1 wherein said data storage unit is a RAID.

3. A data communication method adopted by a data communication apparatus for controlling communications of data between a terminal and a data storage unit by way of a network, said data communication method comprising:
    an acceptance step of accepting a request for a communication through said network from said terminal connected to said network;
    a communication step of communicating data with said terminal by way of said network;
    an issuance step of issuing an access command and a control command from an ordered plurality of control commands to said data storage unit in accordance with a request for a communication received in processing carried out at said acceptance step;

a holding step of holding the access command issued in processing carried out at said issuance step, data received from said terminal and data to be transmitted to said terminal;

a first control step of controlling pieces of processing carried out at said acceptance step, said communication step, said issuance step and said holding step;

a control-command-buffering step of buffering the control command from the ordered plurality of control commands issued in said processing carried out at said issuance step;

a fetching step of fetching the control command buffered in processing carried out at said control-command-buffering step;

a judging step of sequentially judging the control command to be a DMA-command down, then a DMA data down, then a DMA data up, then a RAID command down, then a RAID data down, then a RAID data up;

an acquisition step of acquiring the access command held in said processing carried out at said holding step in accordance with the control command fetched in processing carried out at said fetching step;

an output step of outputting the access command acquired in processing carried out at said acquisition step to said data storage unit; a data-buffering step of buffering data to be stored in said data storage unit or data read out from said data storage unit;

a transfer step of transferring data between said processing carried out at said holding step and processing carried out at said data-buffering step in accordance with the control command fetched in said processing carried out at said fetching step; and a second control step of controlling pieces of processing carried out at said control-command-buffering step, said fetching step, said acquisition step, said output step, said data-buffering step and transfer step, wherein pieces of processing at said first and second control steps are carried out independently of each other.

4. A memory for storing a computer readable program for controlling communications of data between a terminal and a data storage unit by way of a network wherein said program comprises:

an acceptance step of accepting a request for a communication through said network from said terminal connected to said network;

a communication step of communicating data with said terminal by way of said network;

an issuance step of issuing an access command and a control command from an ordered plurality of control commands to said data storage unit in accordance with a request for a communication received in processing carried out at said acceptance step;

a holding step of holding the access command issued in processing carried out at said issuance step, data received from said terminal and data to be transmitted to said terminal;

a first control step of controlling pieces of processing carried out at said acceptance step, said communication step, said issuance step and said holding step;

a control-command-buffering step of buffering the control command from an ordered plurality of control commands issued in said processing carried out at said issuance step;

a fetching step of fetching the control command buffered in processing carried out at said control-command-buffering step, a judging step of sequentially judging the control command to be a DMA-command down, then a DMA data down, then a DMA data up, then a RAID command down, then a RAID data down, then a RAID data up;

an acquisition step of acquiring the access command held in said processing carried out at said holding step in accordance with the control command fetched in processing carried out at said fetching step;

an output step of outputting an access command acquired in processing carried out at said acquisition step to said data storage unit;

a data-buffering step of buffering data to be stored in said data storage unit or data read out from said data storage unit;

a transfer step of transferring data between said processing carried out at said holding step and processing carried out at said data-buffering step in accordance with the control command fetched in said processing carried out at said fetching step; and a second control step of controlling pieces of processing carried out at said control-command-buffering step, said fetching step, said acquisition step, said output step, said data-buffering step and transfer step, wherein pieces of processing at said first and second control steps are carried out independently of each other.

5. A program stored on a memory for controlling communications of data between a terminal and a data storage unit by way of a network, said program comprising:

an acceptance step of accepting a request for a communication through said network from said terminal connected to said network;

a communication step of communicating data with said terminal by way of said network;

an issuance step of issuing an access command and a control command from an ordered plurality of control commands to said data storage unit in accordance with a request for a communication received in processing carried out at said acceptance step;

a holding step of holding the access command issued in processing carried out at said issuance step, data received from said terminal and data to be transmitted to said terminal;

a first control step of controlling pieces of processing carried out at said acceptance step, said communication step, said issuance step and said holding step;

a control-command-buffering step of buffering the control command from an ordered plurality of control commands issued in said processing carried out at said issuance step;

a fetching step of fetching the control command buffered in processing carried out at said control-command-buffering step, a judging step of sequentially judging the control command to be a DMA-command down, then a DMA data down, then a DMA data up, then a RAID command down, then a RAID data down, then a RAID data up;

an acquisition step of acquiring the access command held in said processing carried out at said holding step in accordance with the control command fetched in processing carried out at said fetching step;

an output step of outputting the access command acquired in processing carried out at said acquisition step to said data storage unit;

a data-buffering step of buffering data to be stored in said data storage unit or data read out from said data storage unit;

a transfer step of transferring data between said processing carried out at said holding step and processing carried out at said data-buffering step in accordance with the control command fetched in said processing carried out at said fetching step; and a second control step of controlling pieces of processing carried out at said control-command-buffering step, said fetching step, said acquisition step, said output step, said data-buffering step and transfer step, wherein pieces of processing at said first and second control steps are carried out independently of each other.

6. A data communication system comprising a first information-processing apparatus for communicating data with a terminal connected to a network by way of said network and a second information-processing apparatus for controlling accesses to a data storage unit wherein said first information-processing apparatus comprises:

an acceptance means for accepting a request for a communication through said network from said terminal connected to said network;

a communication means for communicating data with said connected terminal by way of said network;

an issuance means for issuing an access command and a control command from an ordered plurality of control commands to said data storage unit in accordance with a request for a communication received by said acceptance means;

a memory for temporarily holding the access command issued by said issuance means, data received from said terminal and data to be transmitted to said terminal; and a supplying means for supplying the control command issued by said issuance means to said second information-processing apparatus;

whereas said second information-processing apparatus comprises:

a control-command buffering means for buffering the control command from an ordered plurality of control commands received from said supplying means;

a fetching means for fetching the control command buffered in said control-command buffer, wherein the control command is sequentially judged to be a DMA-command down, then a DMA data down, then a DMA data up, then a RAID command down, then a RAID data down, then a RAID data up;

an acquisition means for acquiring the access command held by said temporary store in accordance with the control command fetched by said fetching means;

an output for outputting an access command acquired by said acquisition means to said data storage unit;

a data buffer for buffering data to be stored in said data storage unit or data read out from said data storage unit; and a transfer means for transferring data between said temporary store and said data buffer in accordance with the control command fetched by said fetching means.

7. A data communication system according to claim 6 wherein said data storage unit is a RAID.

8. An information-processing apparatus for communicating data with a terminal connected to a network by way of said network, said information-processing apparatus comprising:

an acceptance means for accepting a request for a communication through said network from said terminal connected to said network;

a communication means for communicating data with said terminal by way of said network;

an issuance means for issuing an access command and a control command from an ordered plurality of control commands to a data storage unit in accordance with a request for a communication received by said acceptance means, wherein the control command is sequentially judged to be a DMA-command down, then a DMA data down, then a DMA data up, then a RAID command down, then a RAID data down, then a RAID data up;

a memory for temporarily holding the access command issued by said issuance means, data received from said terminal and data to be transmitted to said terminal; and a supplying means for supplying the control command issued by said issuance means to another information-processing apparatus for controlling said data storage unit.

9. An information-processing apparatus according to claim 8 wherein as said data storage unit is a RAID.

10. An information-processing method adopted by an information-processing apparatus for communicating data with a terminal connected to a network by way of said network, said information-processing method comprising:

an acceptance step of accepting a request for a communication through said network from said terminal connected to said network;

a communication step of communicating data with said connected terminal by way of said network;

an issuance step of issuing an access command and a control command from an ordered plurality of control commands to a data storage unit in accordance with a request for a communication received in processing carried out at said acceptance step;

a holding step of holding the access command issued in processing carried out at said issuance step, data received from said terminal and data to be transmitted to said terminal;

a supplying step of supplying the control command issued in said processing carried out at said issuance step to another information-processing apparatus for controlling said data storage unit; and a judging step of sequentially judging the control command to be a DMA-command down, then a DMA data down, then a DMA data up, then a RAID command down, then a RAID data down, then a RAID data up.

11. A memory for storing a computer readable program for communicating data with a terminal connected to a network by way of said network wherein said program comprises:

an acceptance step of accepting a request for a communication through said network from said terminal connected to said network;

a communication step of communicating data with said connected terminal by way of said network;

an issuance step of issuing an access command and a control command from an ordered plurality of control commands to a data storage unit in accordance with a request for a communication received in processing carried out at said acceptance step;

a holding step of holding the access command issued in processing carried out at said issuance step, data received from said terminal and data to be transmitted to said terminal;

a supplying step of supplying the control command issued in said processing carried out at said issuance step to another information-processing apparatus for controlling said data storage unit; and a judging step of sequentially judging the control command to be a DMA-command down, then a DMA data down, then a DMA data up, then a RAID command down, then a RAID data down, then a RAID data up.

12. A program stored on a memory for communicating data with a terminal connected to a network by way of said network, said program comprising:

an acceptance step of accepting a request for a communication through said network from said terminal connected to said network;

a communication step of communicating data with said connected terminal by way of said network;

an issuance step of issuing an access command and a control command from an ordered plurality of control commands to a data storage unit in accordance with a request for a communication received in processing carried out at said acceptance step;

a holding step of holding the access command issued in processing carried out at said issuance step, data received from said terminal and data to be transmitted to said terminal;

a supplying step of supplying the control command issued in said processing carried out at said issuance step to another information-processing apparatus for controlling said data storage unit; and a judging step of sequentially judging the control command to be a DMA-command down, then a DMA data down, then a DMA data up, then a RAID command down, then a RAID data down, then a RAID data up.

13. An information-processing apparatus for controlling accesses to a data storage unit, said information-processing apparatus comprising:

a control-command buffering means for buffering a control command from an ordered plurality of control commands received from another information-processing apparatus;

a fetching means for fetching the control command buffered in said control-command buffer, wherein the control command is sequentially judged to be a DMA-command down, then a DMA data down, then a DMA data up, then a RAID command down, then a RAID data down, then a RAID data up;

an acquisition means for acquiring an access command held by said other information-processing apparatus from said other information-processing apparatus in accordance with the control command fetched by said fetching means;

an output for outputting the access command acquired by said acquisition means to said data storage unit;

a memory for buffering data to be stored in said data storage unit or data read out from said data storage unit; and a transfer means for transferring data between said other information-processing apparatus and said data buffer in accordance with the control command fetched by said fetching means.

14. An information-processing apparatus according to claim 13 wherein said data storage unit is a RAID.

15. An information-processing method adopted by an information-processing apparatus for controlling accesses to a data storage unit, said information-processing method comprising:

a control-command-buffering step of buffering a control command from an ordered plurality of control commands received from another information-processing apparatus;

a fetching step of fetching the control command buffered in processing carried out at said control-command-buffering step;

a judging step of sequentially judging the control command to be a DMA-command down, then a DMA data down, then a DMA data up, then a RAID command down, then a RAID data down, then a RAID data up;

an acquisition step of acquiring an access command held by said other information-processing apparatus from said other information-processing apparatus in accordance with the control command fetched in processing carried out at said fetching step;

an output step of outputting the access command acquired in processing carried out at said acquisition step to said data storage unit;

a data-buffering step of buffering data to be stored in said data storage unit or data read out from said data storage unit; and a transfer step of transferring data between said other information-processing apparatus and processing carried out at said data-buffering step in accordance with the control command fetched in said processing carried out at said fetching step.

16. A memory for storing a computer readable program for controlling accesses to a data storage unit wherein said program comprises:

a control-command-buffering step of buffering a control command from an ordered plurality of control commands received from another information-processing apparatus;

a fetching step of fetching the control command buffered in processing carried out at said control-command-buffering step;

a judging step of sequentially judging the control command to be a DMA-command down, then a DMA data down, then a DMA data up, then a RAID command down, then a RAID data down, then a RAID data up;

an acquisition step of acquiring an access command held by said other information-processing apparatus from said other information-processing apparatus in accordance with the control command fetched in processing carried out at said fetching step;

an output step of outputting an access command acquired in processing carried out at said acquisition step to said data storage unit;

a data-buffering step of buffering data to be stored in said data storage unit or data read out from said data storage unit; and a transfer step of transferring data between said other information-processing apparatus and processing carried out at said data-buffering step in accordance with the control command fetched in said processing carried out at said fetching step.

17. A program stored on a memory for controlling accesses to a data storage unit, said program comprising:

a control-command-buffering step of buffering a control command from an ordered plurality of control commands received from another information-processing apparatus;

a fetching step of fetching the control command buffered in processing carried out at said control-command-buffering step;

a judging step of sequentially judging the control command to be a DMA-command down, then a DMA data down, then a DMA data up, then a RAID command down, then a RAID data down, then a RAID data up;

an acquisition step of acquiring an access command held by said other information-processing apparatus from said other information-processing apparatus in accordance with the control command fetched in processing carried out at said fetching step;

an output step of outputting the access command acquired in processing carried out at said acquisition step to said data storage unit;

a data-buffering step of buffering data to be stored in said data storage unit or data read out from said data storage unit; and a transfer step of transferring data between said other information-processing apparatus and processing carried out at said data-buffering step in accordance with the control command fetched in said processing carried out at said fetching step.

* * * * *